(12) United States Patent
Pelz (10) Patent No.: US 7,690,153 B2
(45) Date of Patent: Apr. 6, 2010

(54) EMERGENCY DOOR ACTUATOR SYSTEM (75) Inventor: Günter Julius Pelz, Oberursel (DE)

(73) Assignee: Eaton Corporation, Cleveland, OH (US)

( * ) Notice: Subject to any disclaimer, the term of this patent is extended or adjusted under 35 U.S.C. 154(b) by 1273 days.

(21) Appl. No.: 10/533,967

(22) PCT Filed: Nov. 6, 2003

(86) PCT No.: PCT/EP03/12374

§ 371 (c)(1),
(2), (4) Date: May 5, 2005

(87) PCT Pub. No.: WO2004/041639

PCT Pub. Date: May 21, 2004

(65) Prior Publication Data

US 2006/0010769 A1     Jan. 19, 2006

(30) Foreign Application Priority Data

Nov. 6, 2002     (EP)     ................... 02079650

(51) Int. Cl.
*E05B 65/10*     (2006.01)
(52) U.S. Cl. ...................................................... 49/141
(58) Field of Classification Search ............... 49/141; 701/45; 340/425.5; 105/348, 349
See application file for complete search history.

(56) References Cited

U.S. PATENT DOCUMENTS

| 3,107,616 | A |   | 10/1963 | Boaz et al. |
| 3,442,048 | A | * | 5/1969  | Elias ............................ 49/141 |
| 3,737,193 | A | * | 6/1973  | Cain ......................... 296/96.22 |
| 3,738,681 | A | * | 6/1973  | Wada et al. .............. 280/728.1 |
| 3,741,583 | A | * | 6/1973  | Usui et al. .................... 280/735 |
| 3,802,123 | A | * | 4/1974  | Frey et al. ....................... 49/141 |
| 3,879,054 | A | * | 4/1975  | Lindblad ...................... 297/480 |
| 4,127,966 | A | * | 12/1978 | Schmidt ....................... 49/141 |
| 4,241,662 | A |   | 12/1980 | Rudenauer et al. |
| 4,421,342 | A | * | 12/1983 | Brown, Jr. .................... 280/740 |
| 4,832,260 | A | * | 5/1989  | Spilde ........................ 236/49.4 |
| 4,889,068 | A | * | 12/1989 | Tabata et al. ................. 116/203 |
| 4,901,817 | A | * | 2/1990  | Carrasco ....................... 182/21 |
| 4,978,089 | A | * | 12/1990 | Alquier et al. ............ 244/129.5 |
| 5,205,069 | A | * | 4/1993  | Shapiro ......................... 49/31 |

(Continued)

FOREIGN PATENT DOCUMENTS

DE     41 24 377     12/1992

(Continued)

OTHER PUBLICATIONS

International Search Report corresponding to PCT/EP2003/012374.

*Primary Examiner*—Jerry Redman
(74) *Attorney, Agent, or Firm*—Quarles & Brady LLP; George E. Haas (57) ABSTRACT An emergency door opening apparatus for use on an aerospace vehicle for moving a door of the vehicle from a closed position to an open position. The apparatus includes a fluid cylinder (16) and piston (18) operatively connected to the door and to the vehicle and a supply or gas generating chemicals (24) which, when ignited, are operable to rapidly generate and supply to the fluid cylinder (16) a sufficient amount of gas to move the fluid cylinder (16) and piston (18) to effect opening of the door.

13 Claims, 8 Drawing Sheets

U.S. PATENT DOCUMENTS

| | | | | |
|---|---|---|---|---|
| 5,279,227 | A | * | 1/1994 | Nishizawa ................... 102/274 |
| 5,642,619 | A | * | 7/1997 | Matsuki et al. ................ 60/632 |
| 5,746,026 | A | * | 5/1998 | Brede et al. .................... 49/506 |
| 5,823,608 | A | * | 10/1998 | Tanaka et al. ............ 296/146.2 |
| 5,944,276 | A | * | 8/1999 | Fohl ............................ 242/374 |
| 5,956,901 | A | * | 9/1999 | Kennedy ...................... 49/141 |
| 6,938,921 | B2 | * | 9/2005 | Fisher ..................... 280/730.2 |
| 2005/0240331 | A1 | * | 10/2005 | Nowak et al. ................. 701/49 |

FOREIGN PATENT DOCUMENTS

| | | |
|---|---|---|
| DE | 42 36 623 | 5/1994 |
| EP | 0 076 210 | 4/1983 |
| EP | 1418121 A1 * | 5/2004 |

* cited by examiner

Fig. 9 ed States Patent No. US 7,690,153 B2

EMERGENCY DOOR ACTUATOR SYSTEM

BACKGROUND OF THE INVENTION

The present invention relates to a new and improved door actuator system for a vehicle and more specifically to an emergency door activating system for use on an aerospace vehicle including a fluid actuator which in the preferred embodiment is a fluid cylinder and piston operatively connected to the door and the vehicle for moving the door between an open and a closed position and wherein a supply of gas generating chemicals is provided which when actuated rapidly generates a supply of gas which is directed to said fluid cylinder and piston to effect rapid movement of the door of the vehicle between a closed position and a open position.

Emergency door activating systems are known including those for rapidly opening the door of an aerospace vehicle in an emergency situation.

One known emergency door activating system manufactured by Ratier-Figac of France utilizes a fluid damper and piston and cylinder assembly which is operatively connected between the body of the aircraft and the door. A reservoir of pressurized nitrogen is connected to the fluid cylinder. When it is desired to open the door in an emergency situation, the pressurized nitrogen is released from the reservoir and directed to the fluid cylinder to rapidly move the piston and effect opening of the door.

The prior art system suffers from the disadvantage that the reservoir of high pressure nitrogen must be maintained at all times on the aircraft. The weight associated with the reservoir of high pressure gas is substantial due to the construction of the reservoir, which is designed to hold approximately 150 $cm^3$ of gas at approx 123 bar, and the weight of the monitoring equipment required to monitor the gas pressure in the reservoir. Aging of seals and leakage of nitrogen from the reservoir over time causes the prior art systems to require periodic maintenance to ensure that high pressure nitrogen is always present in the reservoir for use in an emergency situation to open the door. Monitoring of the gas pressure in the reservoir requires instrumentation which adds cost and weight and requires labor cost. Replacement of gas in the reservoir requires additional labor costs. If the nitrogen pressure becomes low as a result of leakage, the aircraft on which the nitrogen reservoir is located cannot be flown until the pressure is reestablished in the emergency door actuation system. Thus, loss of pressure in the emergency door actuation system is considered a "no go" item for commercial aircraft. It is extremely costly to ground an aircraft for maintenance and thus it is desirable to provide a low maintenance, low weight emergency door actuation system for use on an aerospace vehicle and other vehicles.

BRIEF SUMMARY OF THE INVENTION

The present invention provides a new and improved door activating system for a vehicle and more particularly for use on an aerospace vehicle, which eliminates the use of a permanently pressurized reservoir of fluid and the associated leakage of gas, aging of seals, maintenance, aircraft down time, and weight associated therewith.

The present invention provides a new and improved emergency door activating system for a vehicle which includes a maintenance free actuator having a gas generator for providing a source of pressurized fluid to effect movement of the door.

The present invention provides a new and improved apparatus for moving the door of a vehicle between a closed position and an open position including a fluid cylinder and piston operatively connected to the door and the vehicle and having a first position in which the door of the vehicle is closed and a second position in which the door of the vehicle is opened, a supply of gas generating chemicals, an actuator for activating said supply of gas generating chemicals to generate a supply of gas and direct said generated gas to said fluid cylinder to move said cylinder and piston between said first and second positions to effect movement of the door operatively connected therewith between its open and closed positions.

The present invention provides a new and improved emergency door opening apparatus for use on an aerospace vehicle for moving the door of the vehicle from its closed position to an open position, the apparatus including a fluid cylinder and piston operatively connected to the door and the vehicle for effecting movement of the door relative to the vehicle from its closed to its open position, the fluid cylinder and piston having a first position when the door is closed and a second position when the door is open, a supply of gas generating chemicals which, when ignited, are operable to rapidly generate and supply to the fluid cylinder a sufficient amount of gas to move the fluid cylinder and piston to said second position to effect opening of the door, an initiator for igniting said supply of gas generating chemicals and an actuator for activating said initiator to ignite said supply of gas generating chemicals upon the occurrence of a predetermined event.

DETAILED DESCRIPTION OF THE INVENTION

Figure 1:
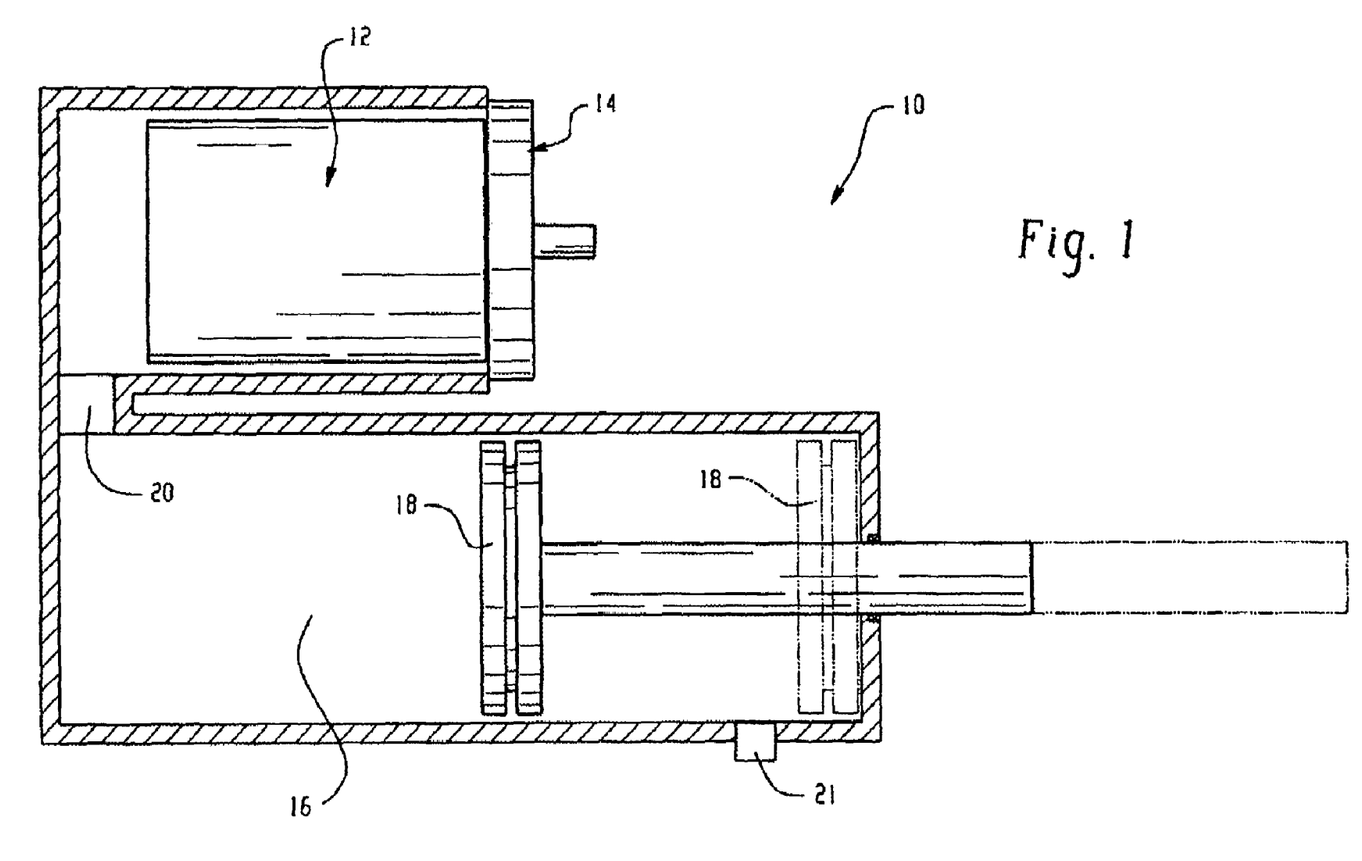
FIG. 1 is a schematic illustration of an emergency door operating system constructed in accordance with the present invention.
Figure 2:
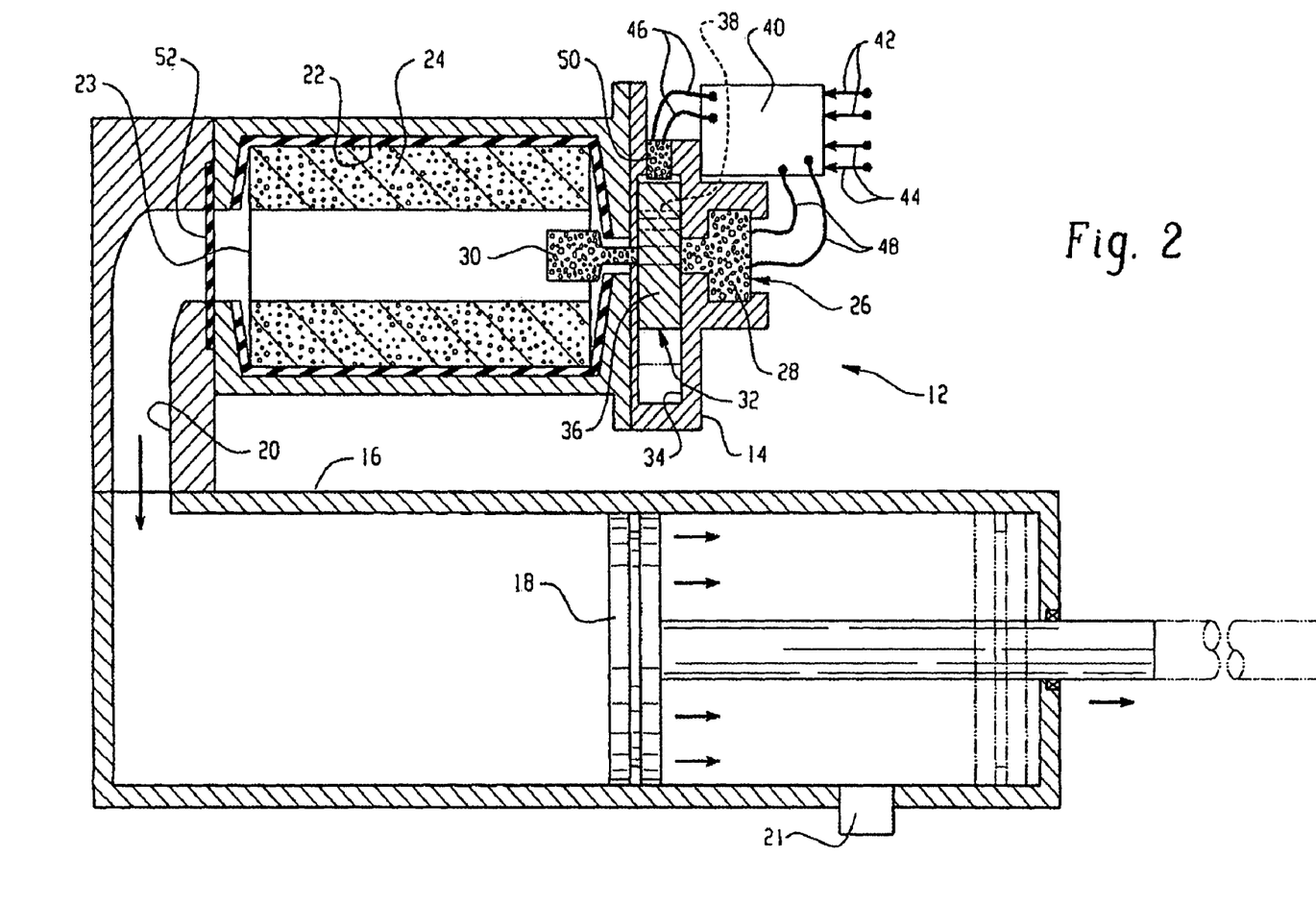
FIG. 2 is a side cross sectional view more fully illustrating the construction of the gas generator and the actuator therefor.

Referring to the figures, and more particularly to FIGS. 1-3, a schematic representation of the emergency door activating apparatus 10 of the present invention is illustrated. While the present emergency door activating apparatus 10 is disclosed in conjunction with an aerospace vehicle and more particularly an aircraft schematically illustrated at 62, the present apparatus could be used to actuate doors of other types of vehicles such as trains, trucks or cars. The door activating apparatus 10 includes a gas generator 12 having a supply of gas generating chemicals 24 located therein. A service lid 14 seals the gas generator 12 and includes an initiator 26 and a safe and arm unit 32. When the safe and arm unit 32 and initiator 26 are actuated, the supply of gas generating chemicals 24 rapidly provides a supply of pressurized fluid which in the present embodiment is a gas.

Figure 3A:
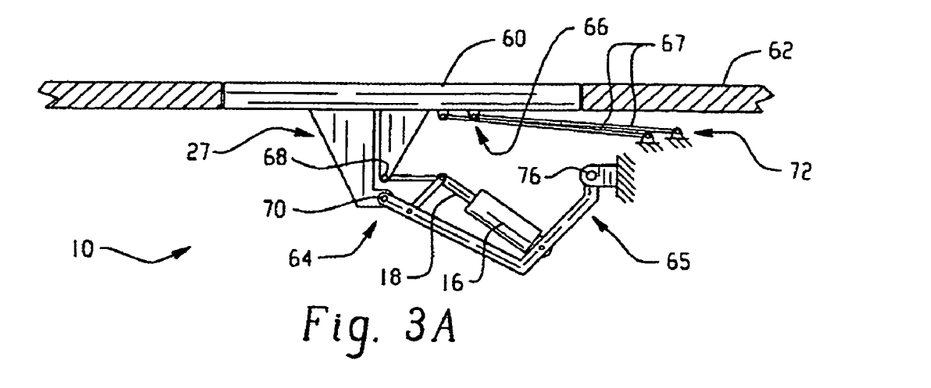
FIGS. 3A, 3B, 3C, 3D, and 3E schematically illustrate the sequential movement of the door activating system and the movement of the door as the fluid cylinder, piston and linkage assemblies operatively move in response to actuation of the gas generator from their positions shown in FIG. 3A in which the door is closed to their position shown in FIG. 3E in which the door is fully opened.
Figure 3B:
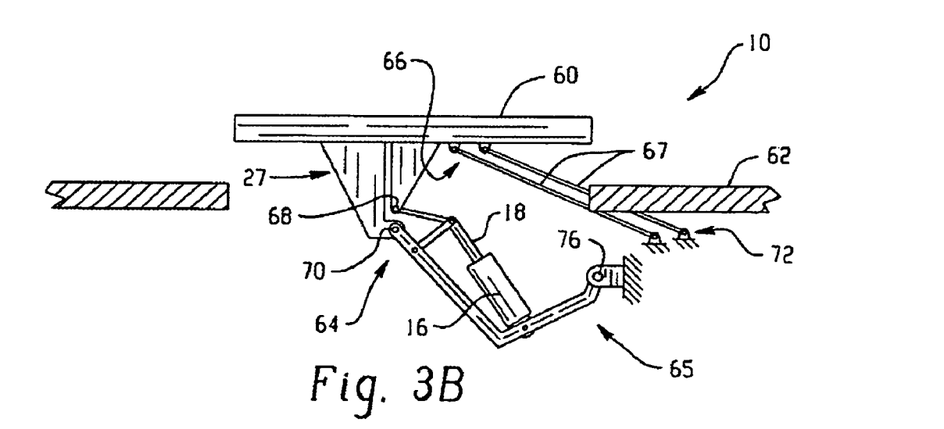
Figure 3C:
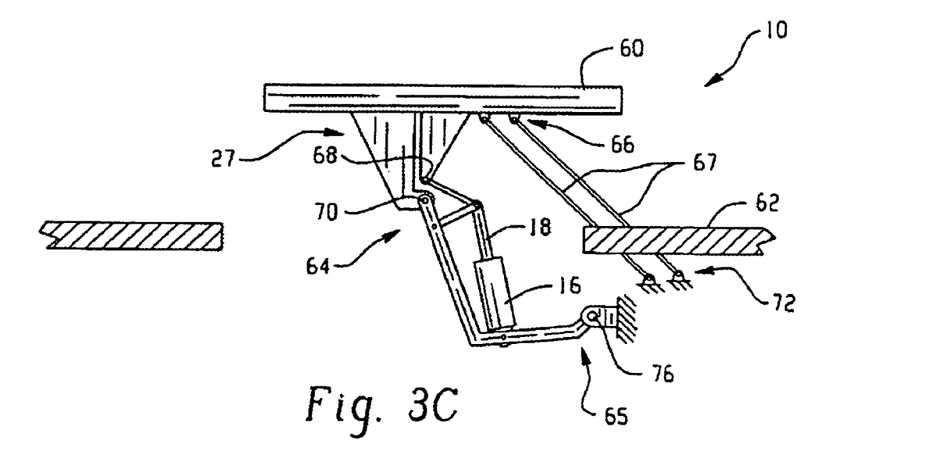
Figure 3D:
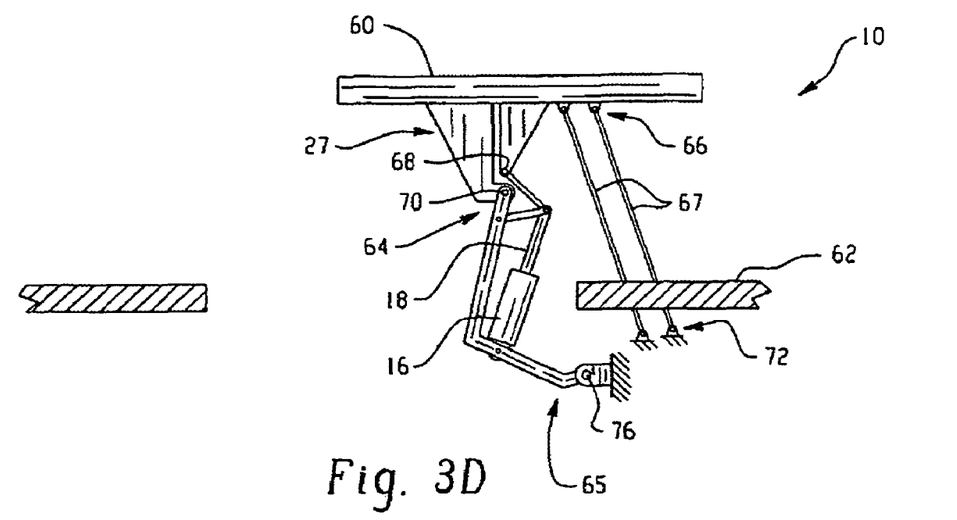
Figure 3E:
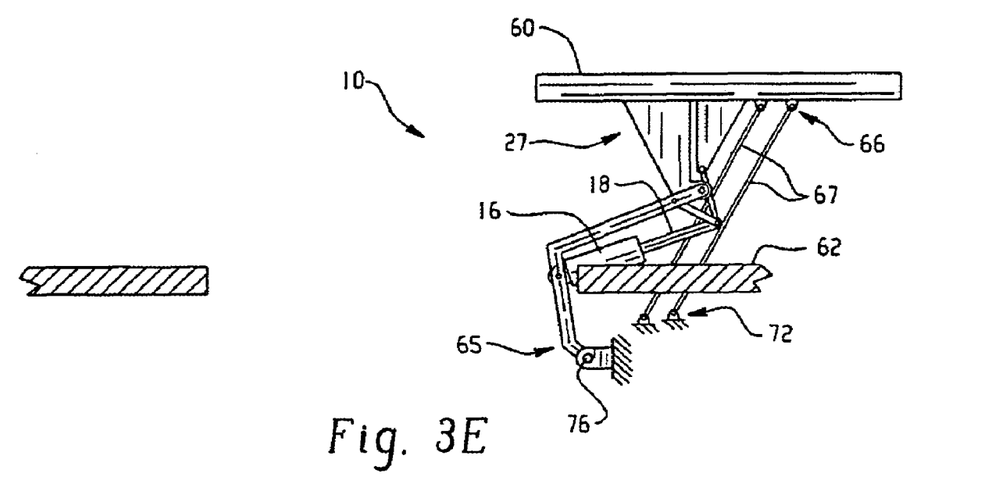

A fluid cylinder 16 and piston 18 are operatively connected to the gas generator 12. When the gas generator 12 is activated, the gas generated flows from the gas generator 12 through a passageway 20 into the fluid cylinder 16 to rapidly effect movement of the piston 18 relative to the fluid cylinder 16 from its full line position to its phantom line position illustrated in FIG. 1. A relief valve 21 is provided in cylinder 16 to relieve high pressure from the fluid cylinder after piston 18 moves to its fully extended position illustrated in phantom lines in FIG. 2 and in FIG. 3E. The relief valve 21 opens the interior of fluid cylinder 16 to atmosphere after the piston 18 passes by relief valve 21 as the piston 18 moves to its phantom line position illustrated in FIG. 1. The fluid cylinder 16 and piston 18 are operatively connected via a linkage assembly 27, more fully illustrated in FIG. 3, to a door 60 and to the body of the aerospace vehicle 62. When gas generator 12 is activated, high pressure fluid is directed into the fluid cylinder 16 to extend piston 18 from fluid cylinder 16 and as is more fully illustrated in FIG. 3, to effect movement of the door from a first position, in which the door 60 is closed, as illustrated in FIG. 3A to a second position, in which the door is opened, as illustrated in FIG. 3E. While the present embodiment of the invention effects movement of the door 60 from a closed to an open position, it should be appreciated that it is within the scope of the present invention to close the door 60 rather than open it by causing cylinder 16 and piston 18 to collapse rather than extend or by modifying the linkage assembly 27.

Figure 4:
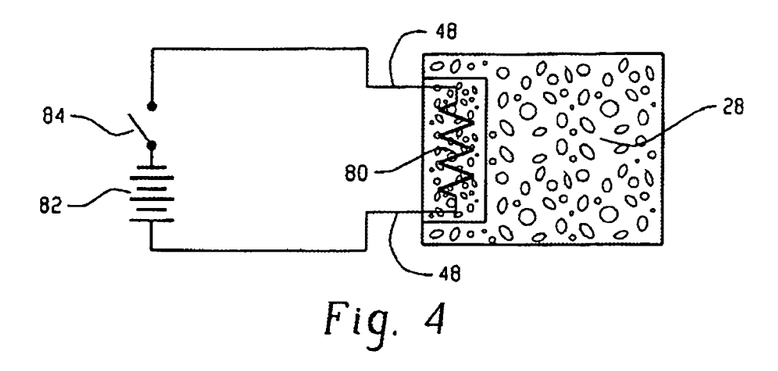
FIG. 4 is a schematic illustration disclosing the use of a power supply such as a battery for activating the gas generating chemicals.
Figure 5:
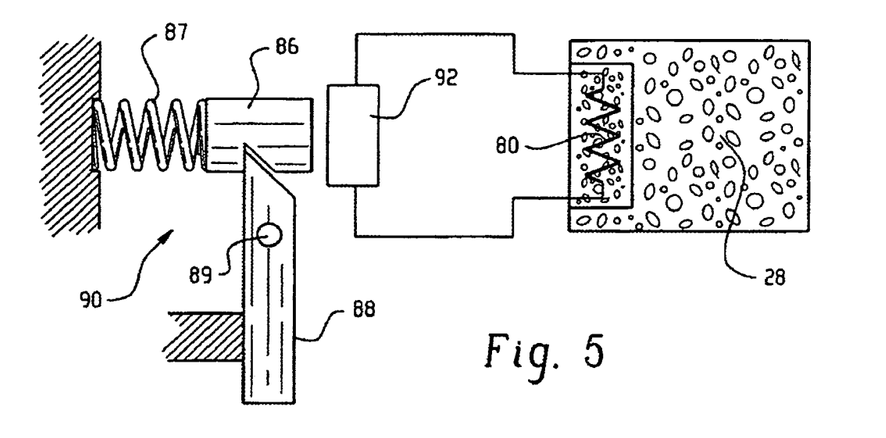
FIG. 5 is a schematic illustration similar to that disclosed in FIG. 4 wherein a piezo electric element is utilized to actuate the supply of gas generating chemicals.
Figure 6:
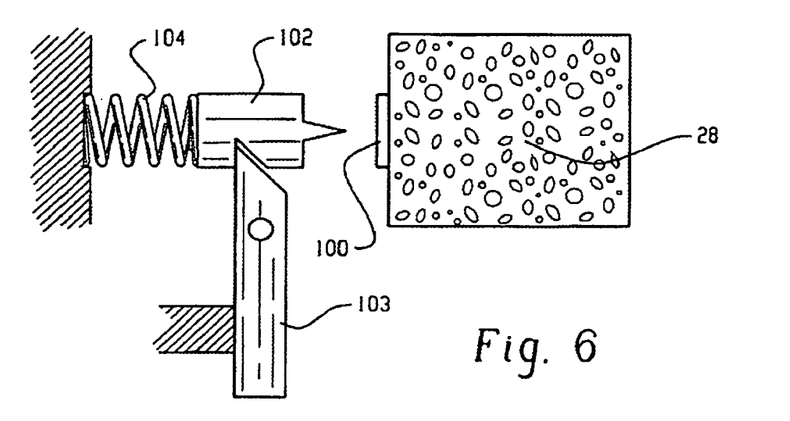
FIG. 6 is a schematic illustration similar to that disclosed in FIG. 4 wherein an explosive primer which is mechanically actuated is utilized to effect actuation of the gas generating chemicals.

The gas generator 12, more fully illustrated in FIG. 2, includes a chamber 22 in which a supply of gas generating chemicals 24 is disposed. A sealing membrane 23 may be interposed between the gas generating chemicals 24 and the walls of chamber 22 to seal the gas generating chemicals 24 to prevent degradation thereof from exposure to atmospheric conditions. A sealing diaphragm 52 is also provided to seal chamber 22 to prevent communication between the chamber and the passageway 20. An initiator 26 is provided for activating the gas generating chemicals 24. When initiator 26 is activated, the initiation 26 burns rapidly and effects ignition of the gas generating chemicals 24. An actuator, more fully illustrated in FIGS. 4-6 is provided for activating the initiator 26 in response to the occurrence of a predetermined condition.

The initiator 26 includes a first portion of initiator material 28 and a second portion of initiator material 30 which is spaced apart from the first portion of initiator material 28. The second portion 30 is disposed within chamber 22 adjacent to the gas generating chemicals 24. When the second portion of initiator material is ignited, the ignition thereof ignites gas generating chemicals 24.

The safe and arm unit 32 includes an arming member 36 which normally physically separates the first portion of initiator material 28 and the second portion of initiator material 30 as is illustrated in FIG. 2. The safe and arm unit 32 prevents ignition of initiator material 30 in the event that the first portion of initiator material 28 is inadvertently ignited without activating the safe and arm unit 32.

Arming member 36 which normally separates the first and second portions of initiator material 28, 30 is slidable within a bore 34 disposed in the lid 14 of the gas generator 12. The arming member 36 includes a transverse passageway 38 which provides communication between the first portion of initiator material 28 and the second portion of the initiator material 30 when the safe and arm unit 32 is actuated and arming member 36 is moved to its phantom line position shown in FIG. 2. The transverse passageway 38 aligns with the first and second portions of initiator material 28, 30 when the safe and arm unit 32 is actuated to "arm" the door activating apparatus 10 by moving arming member 36 from its full line to its phantom line position illustrated in FIG. 2. The safe and arm unit 32 includes an actuator 50 for moving the arming member 36 from its full line position to its phantom line position illustrated in FIG. 2 when it is desired to actuate the emergency door activating apparatus 10. The actuator 50 in one embodiment is a small initiator charge which when actuated rapidly moves arming member 36 from its full to its phantom line "armed" position. However, it should be apparent that other types of actuators such as solenoids, manual, pneumatic, or hydraulic actuators could also be utilized to move arming member 36. If initiator material 28 is actuated and the arming member 36 is not moved to its "armed" position, portion 30 of the initiator material will not be ignited and the gas generating material 24 will not be activated.

A control unit 40 is attached to the service lid 14 of the gas generator 12. The control unit 40 includes a pair of power inputs 42 for supplying power to the control unit 40 and for activating the initiator 26. A pair of control inputs 44 for receiving signals from an actuator (not illustrated) are also provided to control unit 40. The actuator (not illustrated) can be a manual switch, or can be connected to a sensor to automatically energize the initiator 26 in response to a signal indicating the occurrence of a predetermined event such as an emergency. When a signal is received on the control inputs 44 indicative of an emergency situation in which it is desired to actuate the emergency door activating apparatus 10, a signal is supplied to control inputs 44 to sequentially energize conductors 46 to actuate the safe and arm unit 32 and then to energize conductors 48. The conductors 46 are connected to actuator 50 which, when energized, moves the arming member 36 from its full line position illustrated in FIG. 2 to its phantom line, "armed" position illustrated in FIG. 2 in which transverse passageway 38 aligns with the first and second portions 28, 30 of the initiator 26. Conductors 48 are then energized to actuate the first portion 28 of the initiator material. Ignition of the first portion of initiator material 28 causes initiator material 28 to burn and ignite the second portion 30 of the initiator material via the passageway 38. Ignition of the second portion 30 of initiator material effects ignition of the supply of gas generating chemicals 24 which upon ignition rapidly burn to establish a supply of gas to effect movement of the cylinder 16 and piston 18 from the position illustrated in FIG. 3A to the position illustrated in FIG. 3E to effect opening of the door 60. If the safe and arm unit 32 is not actuated and the first portion of initiator material 28 is inadvertently actuated, arming member 36 which normally separates the first and second portions of initiator material will prevent ignition of the second portion 30 of initiator material by the first portion of initiator material 28.

A diaphragm 52 is provided for sealing the passageway 20 and for sealing the supply of gas generating chemicals 24 in chamber 22 to prevent contamination thereof. Upon actuation of the gas generator 12, the generation of gas by the rapid ignition of the supply of gas generating material 24 causes the pressure in chamber 22 to increase to the point that the diaphragm 52 ruptures to allow the supply of high pressure generated gas to pass through the passageway 20 to the fluid cylinder 16.

The sequential opening of a door 60 of the vehicle 62 upon energization of the gas generator 12 is disclosed in FIGS. 3(A)-3(E). The linkage assembly 27 interconnects the fluid cylinder 16 and piston 18 to the door 60 and to the body of vehicle 62. The linkage assembly 27 includes a linkage 64 which interconnects the cylinder 16 and piston 18 to the door 60 and a linkage 65 which interconnects fluid cylinder 16 and the body of the vehicle 62. The linkage 64 pivotably connects the fluid cylinder 16 and piston 18 at 68 and 70 to the door 60 and the linkage 65 pivotably connects the fluid cylinder 16 at 76 to the structure or body of the vehicle 62. A pair of links 67 pivotably support door 60 on the body of the vehicle 62. The links 67 are each pivotably connected at one end to the door 60 at 66 and are pivotably connected at the opposite end at 72 to the body of the vehicle 62. The links 67 support the door 60 and allow movement of the door 60 between its closed and its open positions. It should be appreciated that if desired, the piston 18 could be connected to the body of the vehicle 62, and the door 60, and the cylinder 16 could be connected to the body only by reversing the piston 18 and cylinder 16.

In the preferred embodiment, the vehicle 62 comprises an aerospace vehicle such as an aircraft although it should be appreciated that other types of vehicles could have their doors actuated by the emergency door actuation system 10. When the door 60 is in its closed position, illustrated in FIG. 3A and the emergency door actuation system 10 is energized, the gas generator 12 will be actuated to cause the flow of the gas generated by the high pressure gas generating chemicals 24 through the passageway 20 into the cylinder 16. When gas enters cylinder 16, piston 18 moves toward the right as is shown in FIG. 1 to lengthen the cylinder 16 and piston 18 assembly to initiate opening of the door 60 as is disclosed in FIG. 3B. Further flow of fluid from the gas generator 12 into cylinder 16 causes the piston 18 to further extend from the cylinder 16 and effect movement of the door 60 via linkage 64, 65 through its positions shown in FIG. 3C and FIG. 3D to its fully open position shown in FIG. 3E.

FIGS. 4-6 show various means for activating the initiator 26. FIG. 4 discloses the use of an electrical bridge wire 80 which is embedded in the first portion 28 of initiator material. A battery 82 can be connected across the bridge wire 80 by closing of a switch or actuator 84. When battery 82 is connected across bridge wire 80, the bridge wire heats up in a well known manner to ignite the initiator material 28, to effect ignition of the gas generating chemicals 24 (assuming the safe and arm unit 32 has been moved to its arm position) to effect movement of the door 60 between its closed and open positions.

FIG. 5 schematically illustrates the use of a piezo electric actuator 90 to energize bridge wire 80 and effect actuation of the initiator 26. The piezo electric actuator 90 includes an actuator 86 which is moved to the left, as illustrated in FIG. 5, against the force of spring 87 by pivotal movement of a lever 88 about pivot point 89. When spring 87 is compressed by movement of lever 88, the lever 88 is released and the spring 87 biases activating member 86 into engagement with a piezo electric crystal 92. When the actuator 86 strikes the piezo electric crystal or material 92, the piezo electric material will establish a charge which will flow through bridge wire 80 to heat bridge wire 80 and cause ignition of the first portion of initiator material 28. If the safe and arm unit 32 has been actuated the first portion of initiator material 28 will ignite the second portion of initiator material 30 to ignite the gas generating chemicals 24. The movement of the lever 88 can be initiated by a manual movement or by an electromechanical actuator (not illustrated) in response to an emergency situation in which it is desired to open the door 60 rapidly.

FIG. 6 discloses the use of an explosive primer 100 to actuate the initiator 26 to ignite the gas generating chemicals 24. A hammer 102 is movable against the biasing force of spring 104 by a lever 103. When the lever 103 is released the spring 104 bias the hammer 102 into the primer 100 to ignite primer 100 and ignite the first portion of initiator material 28 and effect ignition of the gas generating chemicals 24. The lever 103 can be manually hydraulically or electro-mechanically actuated in response to a predetermined condition such as the occurrence of an emergency in which it is desired to open door 60. In each of the actuators disclosed in FIGS. 4-6, the user has a choice of manually activating the actuator or having the actuator automatically actuated in response to the occurrence of a predetermined condition, such as a change in velocity, a fire or a rise in temperature to a predetermined level.

The gas generating chemicals 24 can be chosen to develop various types of gases such as nitrogen or $CO_2$. Preferably, the gas generated is inert such as nitrogen to prevent any reaction with the generated gas. By controlling the composition, shape and the volume of the gas generating chemicals 24, the volume, pressure and speed of generation of gas can be controlled.

There are a large number of different chemistries which can be utilized for the gas generating chemicals 24. Clearly, it is desirable to have an output that is not poisonous, flammable, irritating, carcinogenic or with a bad odor. One example is as follows:

The main chemical component for the gas generating chemicals 24 maybe sodium azide ($NaN_3$) together with $KNO_3$ and $SiO_2$. In the gas generator 12 a mixture of $NaN_3$, $KNO_3$ and $SiO_2$ is ignited through an electrical impulse which causes a relatively slow kind of detonation, called a "deflagration", that liberates a precalculated volume of nitrogen gas.

$$2NaN_3 \rightarrow 2Na + 3N_2$$

The sodium by-product of this reaction and the potassium nitrate generate additional nitrogen in a second reaction.

$$10Na + 2KNO_3 \rightarrow K_2O + 5Na_2O + N_2$$

These two reactions leave potassium oxide and sodium oxide to react with the third compound of the mixture, silicon dioxide, forming alkaline silicate ("glass"), which is a safe and stable, unignitable compound.

$$K_2O + Na_2O + SiO_2 \rightarrow \text{alkaline silicate (glass)}$$

The amount of gas generating chemicals necessary to open door 62 in the present example of the emergency door actuator is approximately 50 grams of sodium azide, plus the other ingredients. Also, a few milligrams of the initiator or initiator material 28 will be required. Of the mass of the gas generating chemicals 24, approximately half will be recovered as gas and the other half as glass. The temperature for decomposition of the sodium azide is 275 C. The actual temperature of the gas at the time of the initiation is a function of both configuration and the pressure to be generated. The 50 grams of sodium azide will produce about 18 liters of nitrogen (standard conditions) at a required pressure of 1800-psi (approx. 123 bar).

Figure 7:
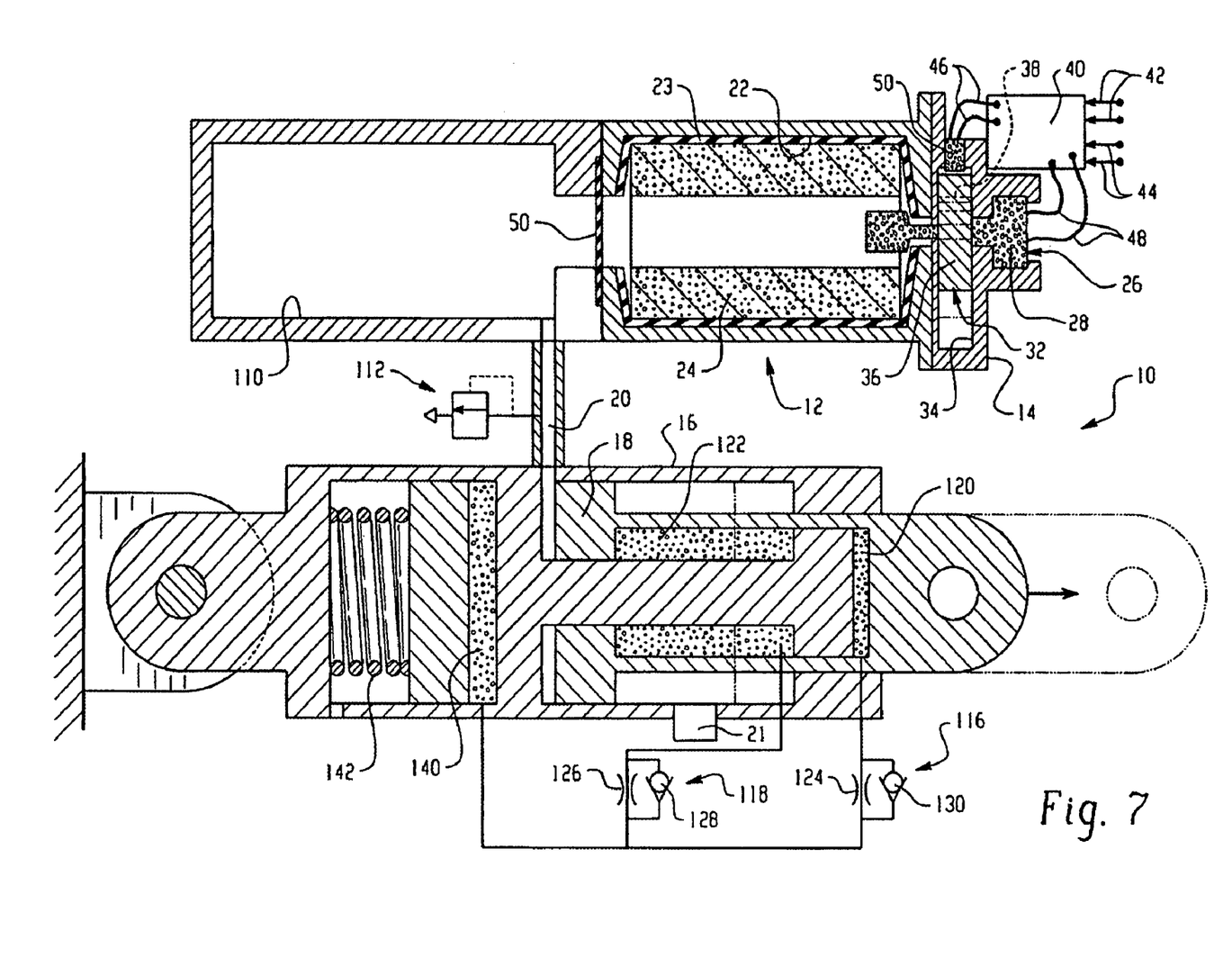
FIG. 7 is a further embodiment of the invention in which a secondary chamber is utilized to capture the rapidly generated gas and release same to the fluid cylinder at a controlled rate and wherein a fluid damper is connected to the piston and cylinder to damp movement thereof.
Figure 8:
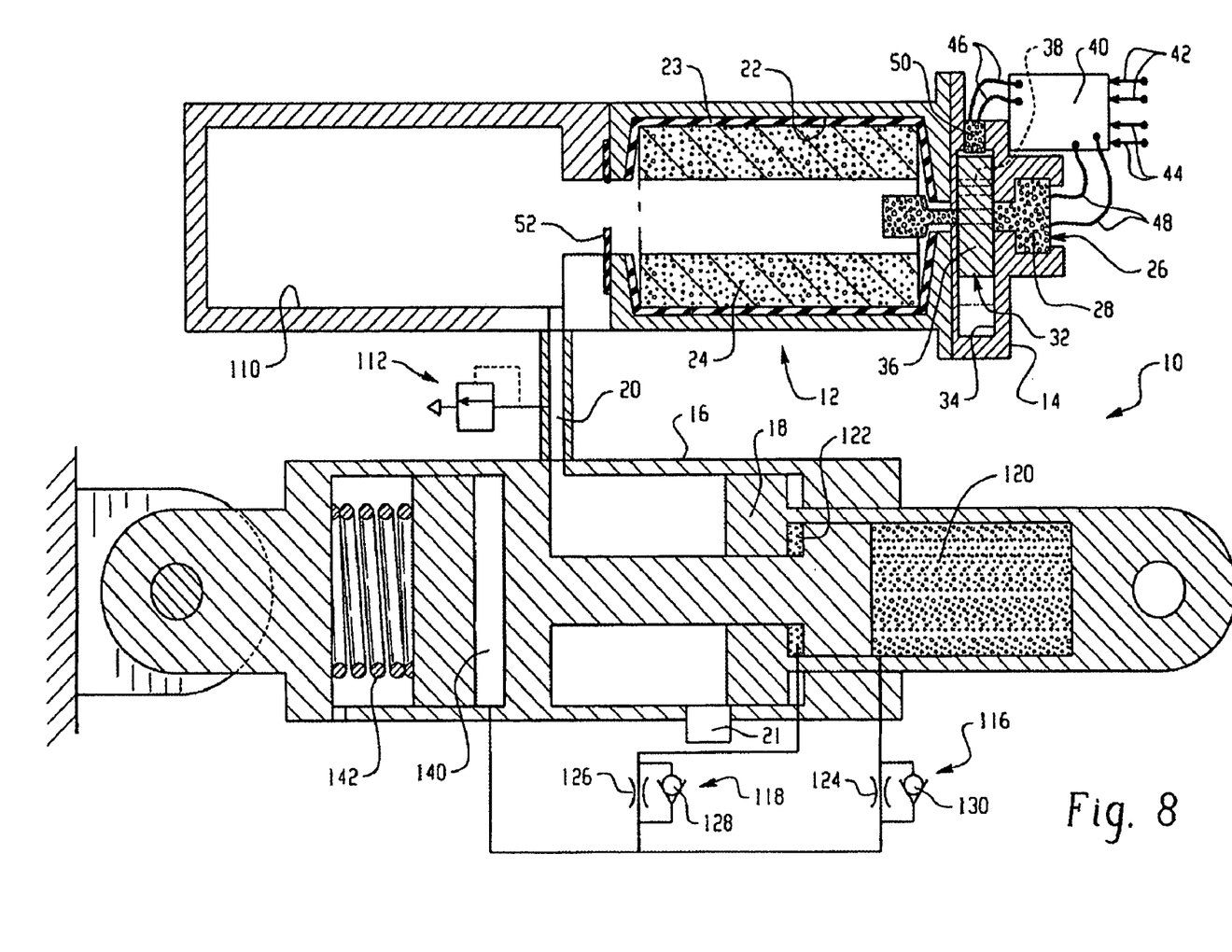
FIG. 8 is an illustration similar to that disclosed in FIG. 7 wherein the diaphragm for sealing the gas generating chemical is initially ruptured by the rapidly generated gas and the piston moves in response to the gas generation.
Figure 9:
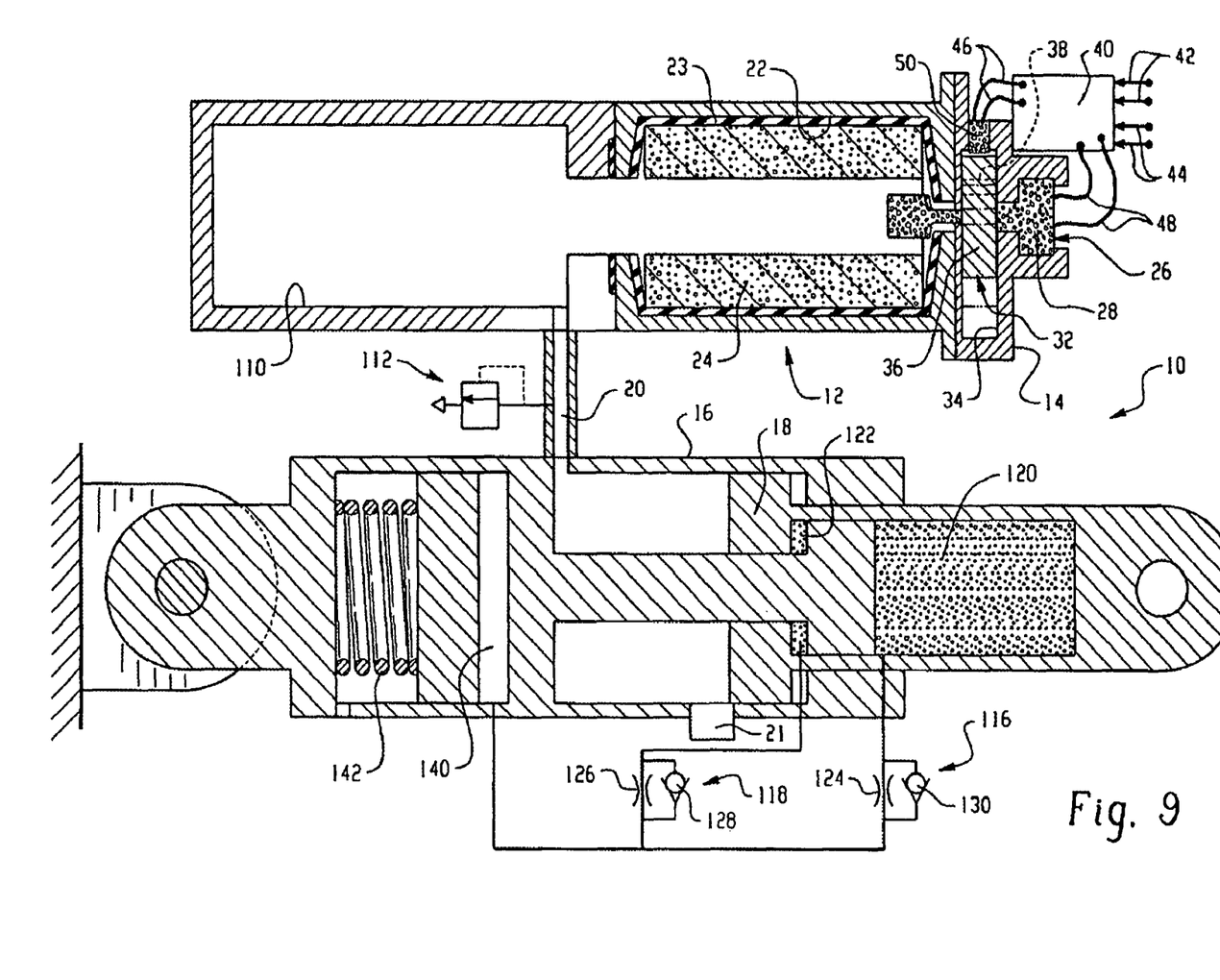
FIG. 9 is an illustration similar to that disclosed in FIG. 8 wherein the diaphragm is fully ruptured.

In one embodiment of the invention, illustrated in FIGS. 7, 8 and 9, an accumulator chamber 110 can be utilized to capture the gas generated by the gas generating chemicals 24 when the gas generating chemicals 24 are rapidly ignited. The accumulating chamber 110 accumulates the rapidly generated gas from the gas generating chemicals 24 and releases the gas at a controlled rate and pressure through the passageway 20 to control the flow of gas into the fluid cylinder 16 to control the speed at which the door 60 moves between its open and closed position.

Since the production and utilization of the gas are not entirely synchronized, the volume 110 of accumulator allows gas to be collected and released at the required rate. For some applications, a pressure reducer, not illustrated, may also be necessary to limit output forces. A relief valve 112 is provided as a safety feature and bleeds line 20 to atmosphere in the event the pressure in line 20 reaches a predetermined set point.

A damper may be provided to limit the velocity of piston 18. The coaxial damper illustrated in FIG. 7 is one of many possible configurations. In moving piston 18 to the right as shown in FIG. 7, (extending, action) during operation the fluid in the damper is forced through a valve 118 to create a speed related opposing force to the piston 18. The valve 118 provides for a restricted fluid flow from damper chamber 122 through restricted orifice 126. A valve 116 allows fluid to be drawn into the opposite damper chamber 120 without cavitation. Thus, as piston 18 moves under the influence of the gas generator 12, the movement of the piston 18 will be damped by the restricted flow of the damping fluid from chamber 122 to chamber 120 through valves 118 and 116 each of which include a restricted orifice and a parallel spring biased check valve. Valve 118 provides for a metered flow of damping fluid from chamber 122 through the restricted orifice 126 and a flow of damping fluid into chamber 120 through the spring biased check valve 130 and restricted orifice 124. Working in the opposite direction (retraction), valve 116 provides for a metered flow of fluid from chamber 120 through the restricted orifice 124 and the flow of damping fluid into chamber 122 through the spring biased check valve 128. Valves 116 and 118 control the flow of damping fluid between damping chambers 120 and 122 as the piston 18 moves between its extended and retracted positions relative to the cylinder 16.

A spring-loaded fluid reservoir 140 allows for volume changes in the damper 114 as well as temperature changes. An allowance for leakage is also included within reservoir 140.

A spring 142 biases piston 144 against the damping fluid disposed in reservoir 140 to provide a pressurized supply of damping fluid to compensate for volume changes in the damper and damping fluid due to temperature changes, leakage or other variables Additional damping means may be provided to damp each end region of the stroke of the actuator movement. This could apply particularly at the extension end when the emergency actuation is deployed.

From the foregoing, it should be apparent that a new and improved apparatus 10 for moving the door 60 of a vehicle 62 between and open and a closed position is disclosed. The apparatus 10 includes a fluid cylinder 16 and piston 18 operatively connected to the door 60 and the vehicle 62 and having a first position in which the door of the vehicle is closed and a second position in which the door of the vehicle is open. A supply of gas generating chemicals 24 is provided and an actuator is provided for igniting the supply of gas generating chemicals 24. The actuator can be a bridge wire 80 which is energized by a source of energy such as a battery 82, a piezo electric device 80 or can be a primer 100 which is impacted to effect ignition of the initiator 26. When the gas generating chemicals 24 are ignited, the chemicals rapidly generate a supply of gas which is supplied to the fluid cylinder 16 to move the piston between its first and second positions to effect movement of the door 60 between its closed and open positions.

It will also be apparent that the gas generating assembly need not be connected to a linear piston and cylinder assembly, but could also be connected to a rotary actuator or motor. The gas generated by the gas generating chemicals could be used to drive an air powered motor with a rotary output connected through the gearing mechanism which could be used to open and close a door.

The invention claimed is:

1. An apparatus for moving a door (60) of a vehicle (62), the apparatus comprising:
   a fluid cylinder (16) and a piston (18) adapted to be operatively connected to the door and the vehicle, wherein the piston has a first position and a second position with respect to the fluid cylinder;
   a supply of gas generating chemicals (24); and
   an initiator (26) initiating said gas generating chemicals (24) to cause said chemicals to rapidly generate a supply of gas and to supply said generated gas to said fluid cylinder (16) to move said piston (18) between said first and second positions to effect movement of the door operatively connected thereto, said initiator comprises a bridge wire (80) that when energized effects ignition of said supply of gas generating chemicals (24) to rapidly generate a predetermined volume of gas.

2. An apparatus as defined in claim 1 for moving the door (60) of a vehicle (62), further including first and second linkage assemblies (27, 65) one of which being adapted to interconnect said fluid cylinder to either the vehicle or the door and the other of which being adapted to interconnect said piston (18) to the other of either the door or the vehicle, said first and second linkage assemblies cooperating with said piston (18) and fluid cylinder (16) for moving the door in response to initiation of said supply of gas generating chemicals (24).

3. An apparatus for moving the door of a vehicle as defined in claim 1, wherein said gas generating chemicals comprises a solid chemical which when activated generates a predetermined volume of gas in a predetermined time period which is dependent on the composition of said gas generating chemical, the volume of said gas generating chemical and the shape of said gas generating chemical.

4. An apparatus for moving the door of a vehicle as defined in claim 1, further comprising a source of energy for energizing said bridge wire (80), said source of energy includes a piezo-electric device (90) connected to said bridge wire (80), said piezo-electric device when actuated generating a sufficient amount of electrical energy to energize said bridge wire to effect ignition of said supply of gas generating chemicals (24) to generate said predetermined volume of gas to move said fluid cylinder (16) and piston (18) between said first and second positions.

5. An apparatus for moving the door of a vehicle as defined in claim 1, wherein said initiator (26) is disposed in close proximity to said supply of gas generating chemicals (24) and a device for activating said initiator, and wherein energization of said device actuates said initiator which rapidly ignites said supply of gas generating chemicals to generate a sufficient amount of gas to move said piston between said first and second positions.

6. An apparatus for moving the door of a vehicle as defined in claim 1, wherein said supply of gas generated by said gas generating chemicals is inert.

7. An apparatus for moving a door of a vehicle according to claim 1 wherein the fluid cylinder and the piston are adapted to be operatively connected to move the door from a closed state to an open state.

8. An apparatus for moving a door of a vehicle according to claim 1 wherein the fluid cylinder and the piston are adapted to be operatively connected to move the door from an open state to a closed state.

9. An apparatus for moving the door of a vehicle, the apparatus comprising:
 a fluid cylinder (16) and a piston (18) adapted to be operatively connected to the door and the vehicle, wherein the piston has a first position and a second position with respect to the fluid cylinder;
 a supply of gas generating chemicals (24);
 an initiator (26) for initiating said gas generating chemicals (24) to cause said chemicals to rapidly generate a supply of gas and to supply said generated gas to said fluid cylinder (16) to move said piston (18) between said first and second positions to effect movement of the door operatively connected thereto; and
 a safe and arm mechanism (32) disposed between said initiator and said supply of gas generating chemicals (24), said safe and arm mechanism including an arming member (36) having a safe position in which said arming member is interposed between said initiator and said supply of gas generating chemicals to prevent initiation of said supply of gas generating chemicals if said initiator is activated, and an armed position in which said arming member (36) facilitates initiation of said supply of gas generating chemicals upon activation of said initiator to generate sufficient gas to move said piston (18) between said first and second positions.

10. An apparatus for moving the door of a vehicle as defined in claim 9, wherein said initiator for initiating said supply of gas generating chemicals (24) includes an explosive primer (100) for effecting ignition of said supply of gas generating chemicals, said primer when detonated effecting ignition of said supply of gas generating chemicals to generate a predetermined volume of gas to move said piston between said first and second positions.

11. An apparatus for moving the door of a vehicle as defined in claim 9, wherein said initiator (26) includes first (28) and second (30) spaced apart portions of a readily ignitable material, said second portion (30) being disposed in close proximity to said supply of gas generating chemicals (24) and being operable to ignite said supply of gas generating chemicals when said first portion (28) of said readily ignitable material is ignited and when the arming member (36) is in the armed position.

12. An apparatus for moving the door of a vehicle as defined in claim 9, wherein said arming member (36) has a passageway therein which provides for fluid communication between first (28) and second portions (30) of said readily ignitable material of said initiator (26) when said arming member is in said armed position and which prevents fluid communication between said first and second portions of said readily ignitable material of said initiator when said arming member is in said safe position.

13. An apparatus for moving the door of a vehicle as defined in claim 9, wherein said initiator (26) is disposed in close proximity to said supply of gas generating chemicals (24) and a device for activating said initiator, and wherein energization of said device actuates said initiator which rapidly ignites said supply of gas generating chemicals to generate a sufficient amount of gas to move said piston between said first and second positions.

\* \* \* \* \*